(12) United States Patent
Cai et al.

(10) Patent No.: US 9,295,979 B2
(45) Date of Patent: Mar. 29, 2016

(54) SYNTHESIS OF NANOSIZED METAL CARBIDES ON GRAPHITIZED CARBON AS SUPPORTING MATERIALS FOR ELECTROCATALYSTS

(75) Inventors: Mei Cai, Bloomfield Hills, MI (US); Peikang Shen, Guangzhou (CN); Guoqiang He, Hangzhou (CN); Zaoxue Yan, Rizhao (CN); Hui Meng, Guangdong (CN); Chunyong He, Xinyu (CN)

(73) Assignees: GM Global Technology Operations LLC, Detroit, MI (US); Sun Yat-Sen University, Guangzhou (CN)

( * ) Notice: Subject to any disclaimer, the term of this patent is extended or adjusted under 35 U.S.C. 154(b) by 135 days.

(21) Appl. No.: 14/002,408

(22) PCT Filed: Mar. 1, 2011

(86) PCT No.: PCT/CN2011/000328
§ 371 (c)(1),
(2), (4) Date: Dec. 2, 2013

(87) PCT Pub. No.: WO2012/116469
PCT Pub. Date: Sep. 7, 2012

(65) Prior Publication Data
US 2014/0080694 A1    Mar. 20, 2014

(51) Int. Cl.
*B01J 27/22* (2006.01)
*C01B 31/30* (2006.01)
(Continued)

(52) U.S. Cl.
CPC .............. *B01J 27/22* (2013.01); *C01B 31/04* (2013.01); *C01B 31/30* (2013.01); *C01B 31/34* (2013.01);
(Continued)

(58) Field of Classification Search
CPC ............ B01J 27/22; B01J 37/30; B01J 39/00; B01J 41/00
USPC .............. 502/177, 185; 501/87; 423/414, 439
IPC ....................... B01J 27/22, 37/30, 39/00, 41/00
See application file for complete search history.

(56) References Cited

U.S. PATENT DOCUMENTS 3,403,008 A * 9/1968 Hamling ....................... 423/251
3,764,550 A   10/1973 Block
(Continued)

FOREIGN PATENT DOCUMENTS

CN    101445234 A    6/2009
CN    101456552 A    6/2009
(Continued)

OTHER PUBLICATIONS

International Search Report dated Dec. 8, 2011 for application No. PCT/CN2011/000328; 4 pages.

*Primary Examiner* — Patricia L Hailey
(74) *Attorney, Agent, or Firm* — Reising Ethington P.C.

(57) ABSTRACT

Particles of a macro-porous ion exchange resin are dispersed in a solution of a transition metal compound, such as a compound of molybdenum, tungsten, or vanadium. The resin may be composed for anion exchange or cation ion exchange and, correspondingly, anions or cations of the metal are exchanged onto active ion exchange sites on the molecular chains of the resin. The resin is then carbonized and graphitized to form nanometer-size particles of transition metal carbide on particles of graphite. The composite metal carbide and graphite particles are electrically conductive and serve well as support particles for later deposited particles of a platinum group metal or other catalyst material in, for example, a catalytic electrode member in an electrochemical cell.

9 Claims, 7 Drawing Sheets

(51) Int. Cl.
*C01B 31/34* (2006.01)
*C01B 31/04* (2006.01)
*H01M 4/92* (2006.01)
*B01J 37/08* (2006.01)
*B01J 37/30* (2006.01)
*B01J 37/34* (2006.01)
*B01J 35/00* (2006.01)

(52) U.S. Cl.
CPC .............. *H01M 4/925* (2013.01); *H01M 4/926* (2013.01); *B01J 35/0013* (2013.01); *B01J 35/0033* (2013.01); *B01J 37/084* (2013.01); *B01J 37/30* (2013.01); *B01J 37/346* (2013.01); *Y02E 60/50* (2013.01)

(56) References Cited

U.S. PATENT DOCUMENTS

| | | | |
|---|---|---|---|
| 3,865,745 A | 2/1975 | Block et al. | |
| 3,944,638 A | 3/1976 | Beatty | |
| 4,789,534 A * | 12/1988 | Laine | 423/249 |
| 4,906,493 A * | 3/1990 | Laine | 427/226 |
| 2010/0285392 A1* | 11/2010 | Elabd et al. | 429/484 |

FOREIGN PATENT DOCUMENTS

| | | | | |
|---|---|---|---|---|
| CN | 10-1456552 | * | 5/2011 | ............ C01B 31/02 |
| DE | 2538346 A1 | | 3/1976 | |

* cited by examiner

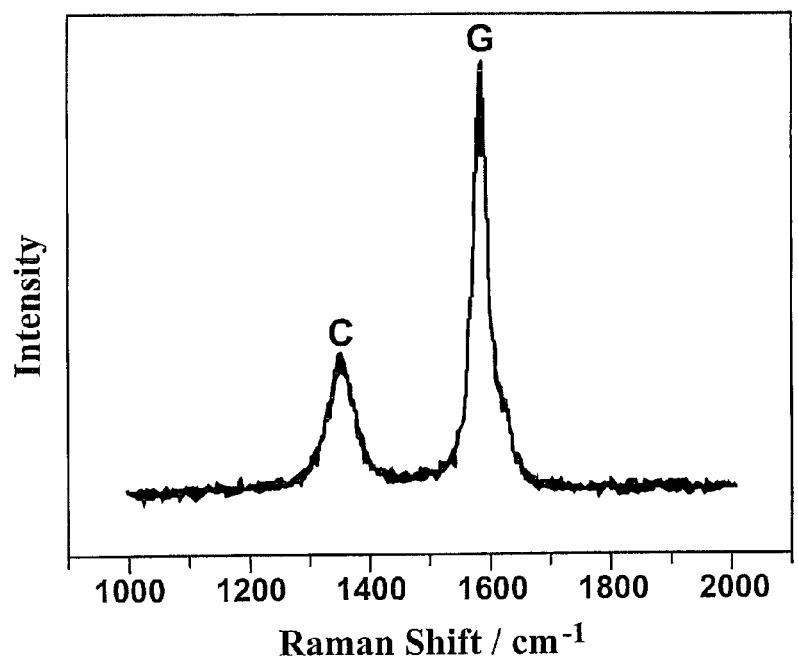
FIG. 3
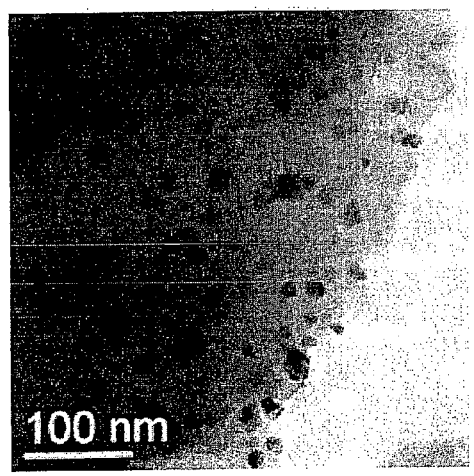 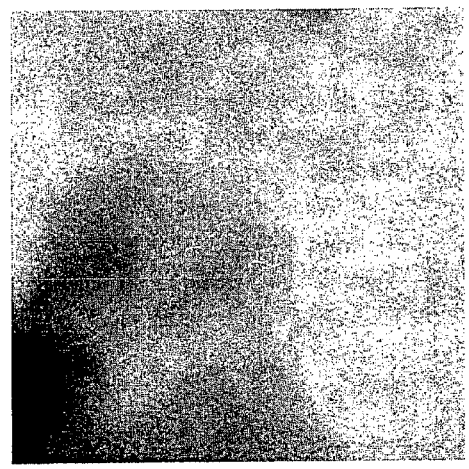
FIG. 4a          FIG. 4b

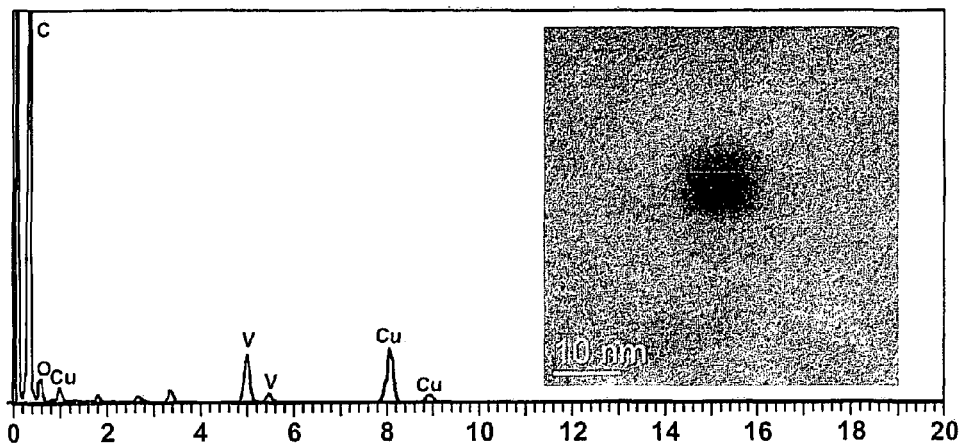
FIG. 9
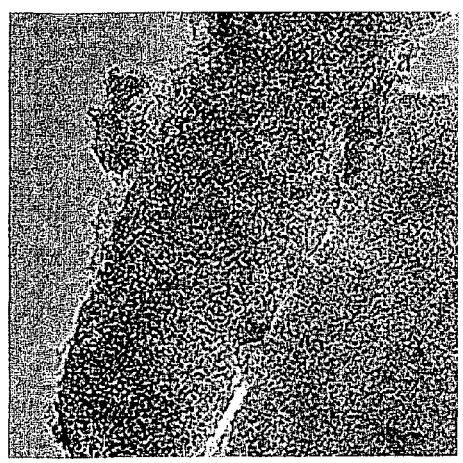 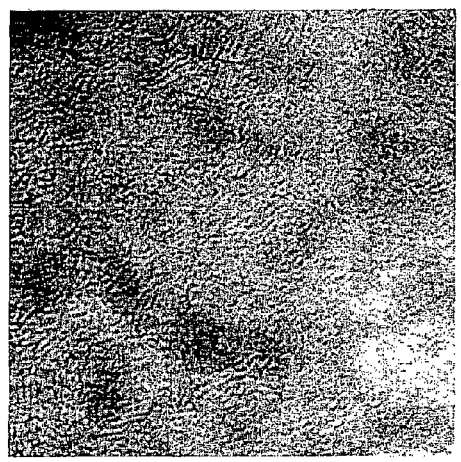
FIG. 10a          FIG. 10b

SYNTHESIS OF NANOSIZED METAL CARBIDES ON GRAPHITIZED CARBON AS SUPPORTING MATERIALS FOR ELECTROCATALYSTS

TECHNICAL FIELD

This disclosure presents an efficient method of preparing a composite of low nanometer size metal carbide particles on graphitized carbon particles. More specifically, ions of a transition metal compound are exchanged into a suitable carbon-based ion-exchange resin, and the resin with dispersed metal ions is carbonized and graphitized to form very small particles of transition metal carbide on particles or flakes of graphite. These electrically conductive composites can be used, for example, as very effective catalyst support materials especially in the field of energy conversion applications.

BACKGROUND OF THE INVENTION

Composites of metal carbide particles deposited on graphitized carbon flakes or particles may be used as supporting particulate structures for small particles of platinum or other metals displaying catalytic activity. The composite support particles are electrically conductive and, in many instances, such supported materials are useful as electrocatalysts in fuel cell electrodes, and for other energy conversion devices.

Traditional methods for preparing metal carbides, such as the carbides of molybdenum, tungsten, or vanadium, as particles on graphitized carbon composites are inefficient and often produce oversized particles. Graphitized carbon is prepared first, and then suitable precursors of Mo, W, and/or V are deposited onto the graphitized carbon. The metal precursor and carbon mixture is then heated to high temperatures to form composites of the metal carbides on graphitized carbon. The preparation method is complex and not very effective. For example, the dispersion of the carbide particles on graphitized carbon is uneven, and the sizes of the particles size are usually larger than 50 nm. The resulting size of the metal carbide in the composite is often found to reduce any cooperative catalytic effect between later deposited catalyst particles (such as precious metal particles) and the larger metal carbides.

There remains a need for a faster and better process to provide more effective forms of metal carbides on graphitized carbon.

SUMMARY OF THE INVENTION

This invention provides a method of forming low nanometer-size (e.g. up to 10-15 nm), transition metal carbide particles on graphitized carbon particles. As prepared, these composite particles serve as excellent support bodies for subsequently deposited platinum group particles or other metal catalyst particles. The metal carbides are preferably carbides of transition metals such as the carbides of one or more of molybdenum, tungsten, or vanadium. In one illustrative embodiment of the invention, for example, the combination of platinum particles on vanadium carbide-graphite carrier particles has excellent properties as an electrocatalyst for oxygen reduction in a proton-conductive membrane electrolyte fuel cell.

The method of this invention uses particles of a suitable macro-porous, ion exchange resin for effective dispersion of ions of the transition metal on and within the particles of the resin. For example, particles of a suitable ion exchange resin are dispersed in a volume of an aqueous solution of ions of the transition metal to obtain exchange and absorption of the ions onto and into the particles. After a determined amount of metal has been exchanged into the resin particles, the metal ion-containing resin particles are then removed from the liquid and dried. The particles are heated to commence carbonization of the resin, which is the source of carbon for the desired metal carbide particles. The material is further heated in a non-oxidizing atmosphere to complete the transformation to very small transition metal carbide particles on larger particles of graphite. The content of transition metal ions exchanged into the resin may be managed to yield a desired amount of metal carbide particles on the graphite and such that the metal carbide particles have maximum dimensions of no more than about ten nanometers or so.

Ion exchange resins for use in methods of this disclosure are often prepared using pore-forming materials which are removed from the finished polymer to leave inter-connected macro-pores in a three-dimensional polymer matrix. The molecular chains of the polymeric resin contain suitable pendant groups that enable the deposit and exchange of, for example, metal ions. Such resins are available in the form of particles. When a transition metal compound and solvent are selected in which the transition metal is part of a cation, then a cation exchange resin may be used. When the transition metal is part of an anion, then an anion exchange resin may be used. Water is a convenient and preferred solvent, and many water soluble transition metal compounds are readily available that contain molybdenum, and/or tungsten, and/or vanadium as part of an anion. Accordingly, illustrative examples of practices of the invention will be presented using carbon-based anion exchange resins.

Examples of suitable anion exchange resins include macro-porous acrylic acid resins and styrene resins. Often these polymers have been prepared to contain, for example, pendent quaternized amine groups with mobile, exchangeable anions (e.g., hydroxide ions). In this example, particles of the selected anion-exchange resin material may be treated in alkaline aqueous solutions, or with an aqueous sodium hypochlorite solution, to assure the presence of hydroxide ions for exchange with anions containing one or more transition metals. In an embodiment in which a cation exchange resin is used, the resin may, if necessary, be treated with, for example, aqueous hydrochloric acid to assure the presence of exchangeable hydrogen ions in the cation exchange resin.

Continuing with the example using anion exchange resin particles, the exchangeable anion-containing resin particles are dispersed, for example, in an aqueous solution of a salt of a transition metal in which the metal atoms are in the anions of the dissolved compound. During a suitable time of dispersion and stirring, anions of tungsten, molybdenum, vanadium or the like are exchanged with the active anion exchange sites of the dispersed resin particles. And the composition and/or concentration of the transition metal salt(s) may be varied to affect the particle size of transition metal carbide in a carbonized graphite composite ultimately formed by this method. Thus, a suitable content of one or more transition metal ions (as anions in this illustrative example) are exchanged into the polymeric molecular structure of the anion exchange resin particles, which disperses the metal element-containing ions within the resin particles for ultimate formation of the desired composite material.

In addition to deposition of ions of the transition metal onto and into the pores of the ion exchange resin particles, it may be preferred to exchange or deposit ions of a metal suitable for catalyzing carbon graphitization of the resin material on and in the pores of the resin particles. This exchange of catalyst metal ions may be accomplished at the same time that the transition metal ions are exchanged, or subsequently. A suitable water-soluble salt(s) of, for example, one or more of iron, cobalt, chromium, and manganese is added to the aqueous medium and stirred. Again, anions of the metal catalyst are thus exchanged or absorbed onto or into the pores of the anion exchange resin particles.

Following the addition/exchange of the transition metal ions and metal catalyst ions with the ion exchange resin, the particles are removed from the water medium. The particles may be washed with water (or other solvent for the respective metal ions) to remove loosely absorbed material, and then suitably dried.

The dried particles are then gradually heated to a temperature of, for example, about 350° C. under air, nitrogen, or argon to commence carbonization of the metals-containing resin material. The partially carbonized material is then progressively further heated in a non-oxidizing atmosphere to gradually convert the resin to graphite and the transition metal ion moieties to metal carbides. These transformations may be completed at a relatively low temperature of about 750° to about 1000° C. The newly formed composite material is washed, successively, in aqueous hydrochloric acid, or a like mineral acid, and de-ionized water to remove residual metal catalyst material inserted for carbonization and graphitization of the original resin particles. The thus-formed, fine, graphite flake particles carry very small particles of one or more transition metal carbides. The carbides may be formed to have particle sizes of less than ten to fifteen nanometers in largest dimension. As stated, these composites of metal carbide particles on graphite serve well as support particles for catalyst metals for use in electrochemical processes. The size and amount of the metal carbide particles cooperate with deposited catalyst particles in the function of the combined catalyst material, Particles of platinum, palladium, or rhodium, or mixtures may be deposited on the metal carbide-graphite support particles by precipitation onto the composite support particles from a suitable solution of a precursor compound of the catalyst element.

Thus, in practices of this invention, a suitable polymeric ion exchange resin is used to exchange and receive suitable amounts of precursor ions of a transition metal and ions of a metal for promoting subsequent carbonization and graphitization of the resin. By exchange of a suitable amount of the transition metal ions with the resin, the metal is well dispersed in the molecular structure of the resin and very small, well distributed particles of metal carbide may be obtained on graphite particles. When graphitization has been completed, it is found that the transition metal(s) ions have reacted with the carbon material to form the respective metal carbide particle portion of the composite support material. Since the precursor for the transition metal carbide and the catalyst for carbonization of the resin are exchanged into the resin before it is heat treated, the process is considered an efficient one-step practice for formation of the composite catalyst support material.

Other objects and advantages of the practices of this disclosure will be apparent from descriptions of preferred examples, which follow in this specification. Reference will be made to drawing figures as described in the following section.

BRIEF DESCRIPTION OF THE DRAWINGS

FIG. 3 presents a Raman spectrum of the GC sample (1200° C. for 1 h) in the range of 1000-4000 $cm^{-1}$. The G-line is observed at about 1584 $cm^{-1}$ which is attributed to the splitting of the graphite $E_{2g}$ stretching mode, resulting from structural intensity of $sp^2$-hybridized carbon atoms. It has a positive shift compared to the highly oriented pyrolytic graphite (HOPG, 1580 $cm^{-1}$). The D-line at about 1354 $cm^{-1}$ is from the vibrations of carbon atoms with dangling bonds in disordered graphite planes and the defects incorporated into pentagon and heptagon graphite-like structures. The G-line is much higher in intensity and narrower in width compared to the D-line. The intensity ratio of the G-line to D-line ($I_G/I_D$) is 3.6, implying that the resin carbon with effectively converted with a high degree of graphitization.

FIGS. 4a and 4b present different TEM images of the WC/GC sample (1000° C. for 1 h). The average size of the WC particles is about 10 nm.

FIG. 9 is a TEM (inset) image and EDS of $V_8C_7$/GC. The black particles are $V_8C_7$ which is proved by the EDS pattern.

FIGS. 10a and 10b are TEM images of a $V_8C_7$/GC sample (1000° C. for 1 h). The average $V_8C_7$ particle size is about 2-3 nm.

DESCRIPTION OF PREFERRED EMBODIMENTS

Figure 1:
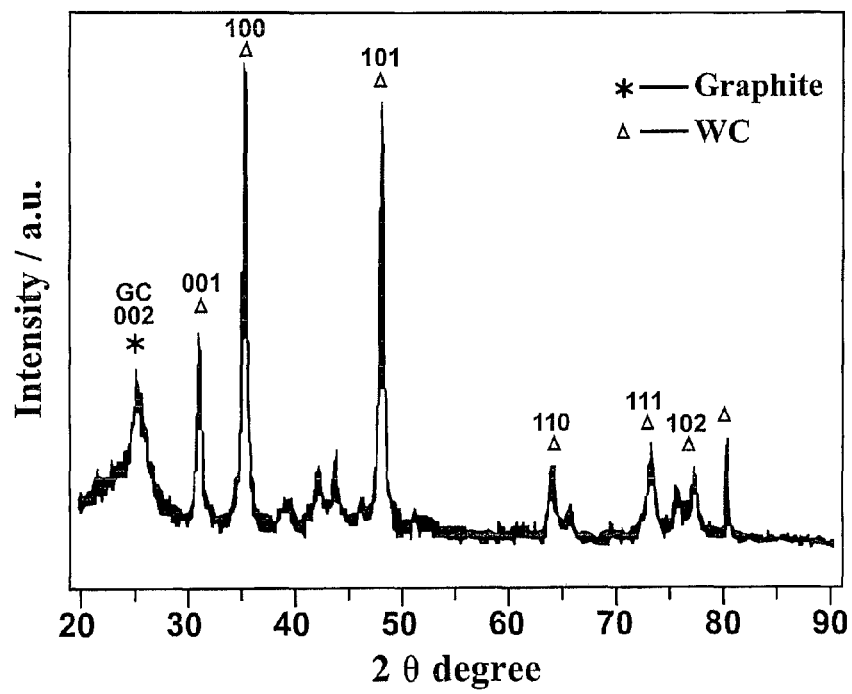
FIG. 1 is a XRD pattern of a composite of tungsten carbide particles on graphitized carbon (WC/GC). The diffraction peak at 2θ=26.2° is characteristic of the graphite (002) facet, demonstrating the sample has been graphitized. The distinct diffraction peaks at 2θ=31.511°, 35.641°, 48.296°, 64.022° and 73.104° are indexed as the (001), (100), (101), (110) and (111) facets of the hexagonal WC phase.
Figure 2:
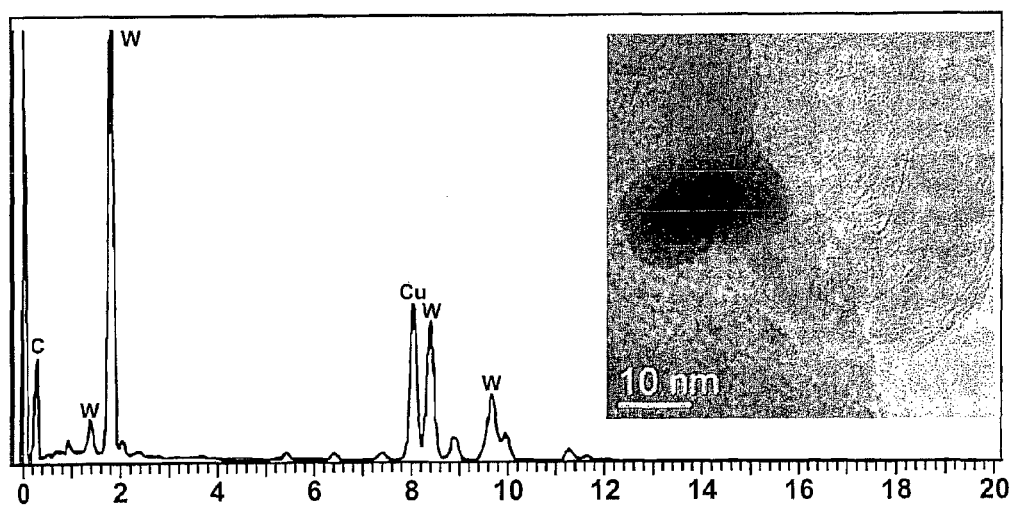
FIG. 2 is a TEM (inset) image and an Energy Dispersive X-Ray Spectroscopy Pattern (EDS pattern) of the WC/GC composite. The black particle is WC which is evidenced in the EDS pattern.
Figure 5:
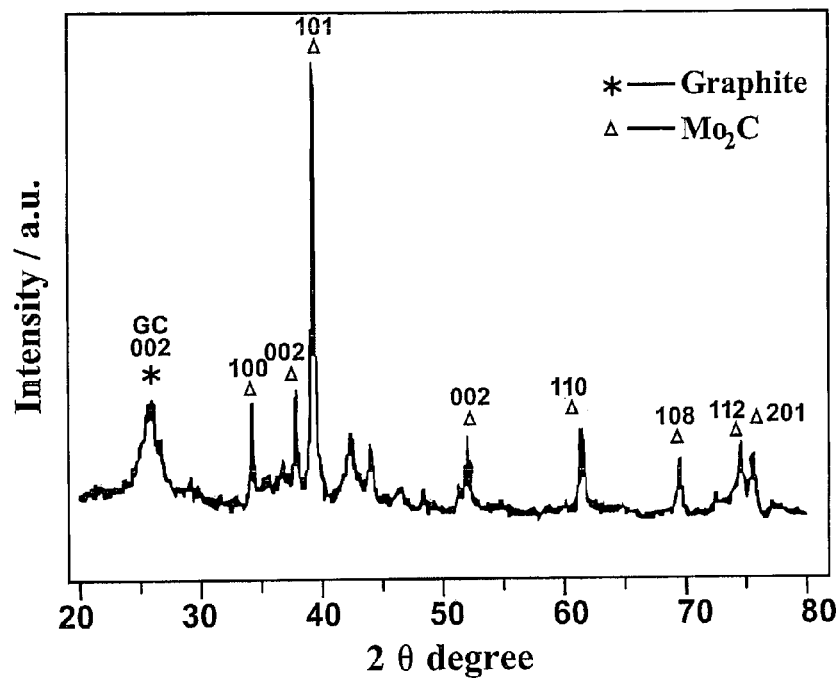
FIG. 5 is a XRD pattern of a $Mo_2C$/GC sample. The diffraction peak at 2θ=26.2° is characteristic of the graphite (002) facet, demonstrating the sample has been graphitized. The distinct diffraction peaks at 2θ=34.354°, 37.978°, 39.392°, 52.122°, 61.527°, 69.565°, 74.645° and 75.513° are indexed as the (100), (002), (101), (102), (110), (103), (112) and (201) facets of hexagonal $Mo_2C$ phase.
Figure 6:
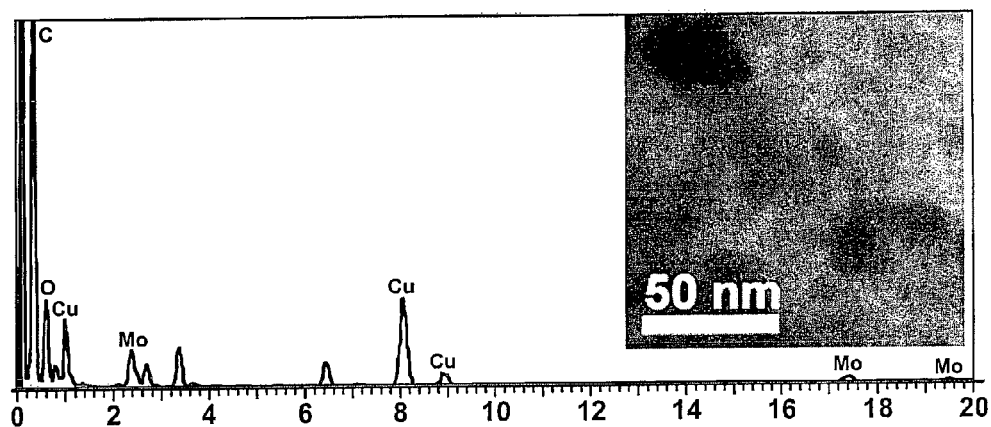
FIG. 6 is a TEM (inset) image and an EDS pattern of the MoC/GC sample. The black particles are $Mo_2C$ which is shown by the EDS pattern. The average $Mo_2C$ particle size is about 2-3 nm.
Figure 7A:
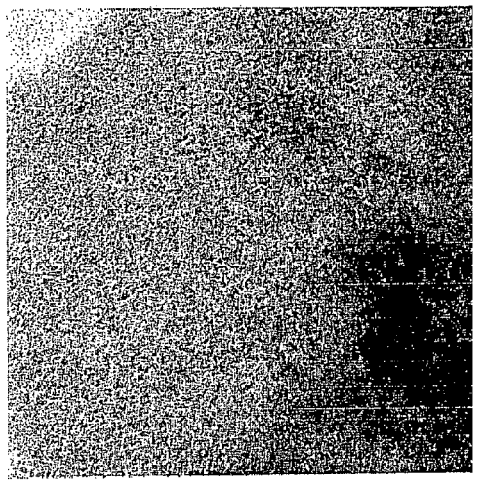
FIGS. 7a and 7b are TEM images of the MoC/GC sample (1000° C. for 1 h). The average $Mo_2C$ particle size is about 2-5 nm.
Figure 7B:
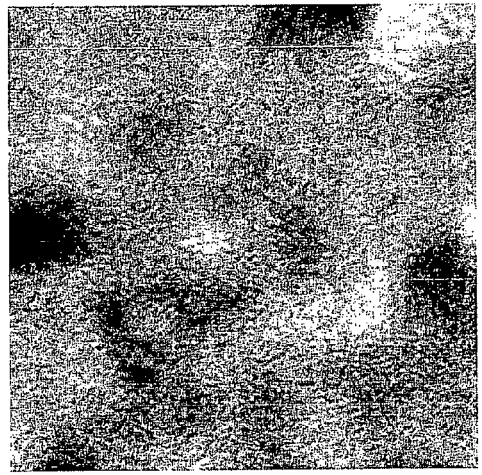
Figure 8:
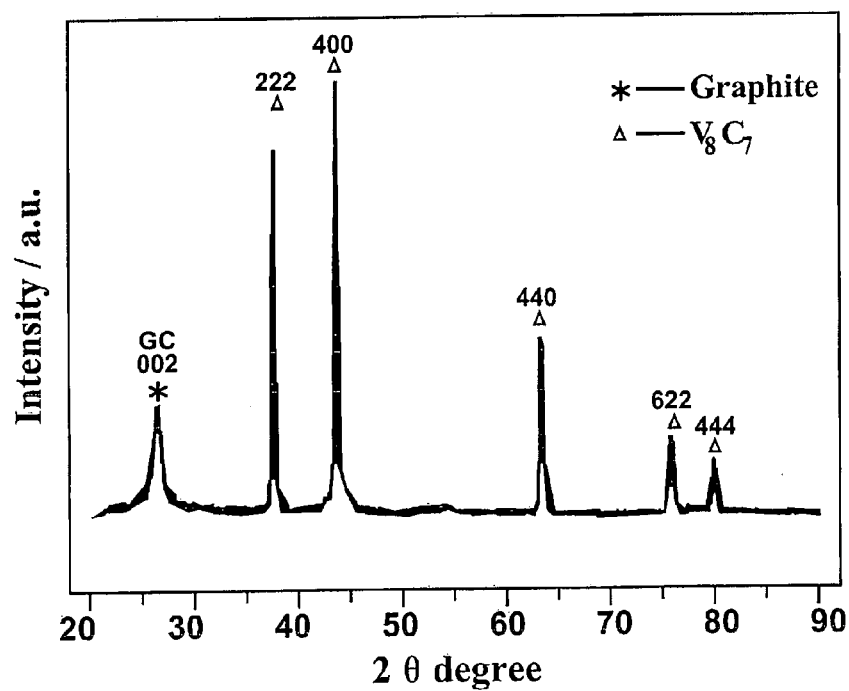
FIG. 8 is a XRD pattern of a $V_8C_7$/GC sample. The diffraction peak at 2θ=26.2° is characteristic of the graphite (002) facet, demonstrating that the sample has been graphitized. The distinct diffraction peaks at 2θ=37.36°, 43.41°, 63.04°, 75.63° and 79.65° are indexed as the (222), (400), (440), (622) and (444) facets of hexagonal $V_8C_7$ phase.

In one embodiment the present invention is directed to a multi-component, noble metal-containing substance having electrocatalytic activity for use as an electrode material in fuel cells (i.e., an electrocatalyst). Preferably, particles of the noble metal (or other catalyst material) are supported on composite support particles of transition metal carbides on graphitized carbon particles.

In general, it is desirable to decrease the concentration of noble metals (especially platinum) to reduce the cost of an electrocatalyst. However, as the concentrations of noble metals are decreased, the electrocatalyst may become more susceptible to corrosion. Thus, it is desirable to achieve the most activity per weight percent of noble metals without compromising the life cycle of the fuel cell in which the electrocatalyst is placed. For example, the composite support materials of this invention may be used in catalytic electrode compositions in the oxygen reduction electrode of a hydrogen/air fuel cell.

The present invention is directed to metal compositions comprising platinum, palladium, nickel, iron, cobalt, or a combination thereof supported on a transition metal carbide(s)/graphitized carbon matrix as electrocatalysts. Preferably, such electrocatalysts have an improved resistance to oxidation (or other corrosion) and/or improved activity compared to platinum or platinum on carbon support particles. In one embodiment, the electrocatalyst particle composition consists essentially of one or more of platinum, palladium, rhodium, nickel, iron, or cobalt. The catalyst particles are carried on electrically conductive, composite support particles comprising low nanometer size particles of tungsten carbide, or molybdenum carbide, or vanadium carbide, or a mixture thereof, carried on graphite particles.

The purpose of this invention is to overcome the problems for synthesis of nanosized carbides on graphitized carbon composite materials by existing methods, including the uneven distribution of the particles, large particle size, and low specific surface area. This invention provides an efficient and rapid substantially one-step method to prepare nanosized carbides on graphitized carbon composite materials with high surface area. In addition, such supporting materials are used to load metal nanoparticles as electrocatalysts.

In accordance with an illustrative embodiment of this disclosure, the preparation of nanosize carbides on graphitized carbon composite materials includes the following steps:

(1) pre-treatment of the ion-exchange resin, if necessary, to prepare the resin for ion exchange with ions of a transition metal compound and with ions of a catalyst for graphitization of the ion exchange resin;

(2) mixing the ion-exchange resin with a solution containing ions of suitable transition metal precursors (tungsten, molybdenum, vanadium salts, etc.);

(3) adding ions of the graphitization catalyst (iron, cobalt, nickel salts) to the above mixture, and cleaning and drying the resin after ion-exchange;

(4) pre-carbonization of the product from step (3) under air, nitrogen, or argon atmosphere by gradually heating the product to a temperature of about 350° C.;

(5) graphitization of the pre-carbonized material in a non-oxidizing atmosphere; and (6) grinding the graphitized materials and washing them in acidic solution to remove residual graphitization catalyst material.

The ion-exchange resins are macro-porous carbon-based, resins selected for exchange with either anions or cations containing atoms of molybdenum, tungsten, and/or vanadium. Suitably, an anion exchange resin is used when the transition metal is part of an anion in its precursor compound, and a cation exchange resin is used for exchange with cations of a precursor compound. Styrene-based ion exchange resins and acrylic acid based ion exchange resins are available in both cation and anion exchange forms. Both styrene and acrylic resins are characterized by very long carbon-to-carbon molecular chains, but have their own characteristic chemical side groups connected to the polymer chains. These pendant groups are chemically modified, in commercial acrylic and styrene resins so that one acrylic or styrene resin may function as an anion exchange resin and another as a cation exchange resin. In practices of this disclosure, the resins are suitably used in the form of macro-porous particles which are dispersed in water for ion exchange with water soluble metal compounds. Preferably, anion exchange resins are prepared, or pretreated, to have exchangeable hydroxyl ions and cation exchange resins are prepared, or pretreated to have exchangeable hydrogen ions. If a pretreatment is necessary, cation exchange resin particles may be treated in an acid solution (e.g., HCl) and anion exchange resins may be pretreated with an alkaline solution (e.g., NaOH), or in sodium hypochlorite (NaOCl) solution.

Water soluble salts of one or more transition metals are then added to the water for ion-exchange with a suitable quantity of dispersed resin particles. The resin particles may be dispersed in the volume of water by suitable stirring. The ions of one or more transition metals are exchanged into resins by ion exchange and uniformly distributed within the resin particles.

The metal precursors are preferably tungsten salts, molybdenum salts and vanadium salts. Further, for simplicity of processing, it is preferred that such precursor compounds be soluble and ionizable in water. Examples of suitable tungsten salts include sodium meta-tungstate, ammonium meta-wolframate, and sodium tungstate, or a mixture of two or more. Suitable molybdenum salts include ammonium molybdate, sodium molybdate, ammonium meta-molybdate, or a mixture of two or more. Examples of suitable vanadium salts include ammonium vanadate, ammonium meta-vanadate, and sodium vanadate, or a mixture of two or more. The metal precursors are added to the dispersion of particles of anion exchange resin in an amount for obtaining metal carbide particle of a suitable size and amount in the final composite materials. Typically, the transition metal salts are added to the water-suspended resin particles to a concentration is in the range from 0.001 to 0.5 mol of transition metal per liter of water used to suspend the resin particles.

The catalysts for carbon graphitization are suitably iron salts, cobalt salts, vanadium salts, manganese salts and chromium salts and mixtures thereof. Examples of suitable iron salts include ferric iron potassium cyanide, potassium ferrocyanide, and ferrous potassium oxalate, and mixtures thereof. Examples of suitable cobalt salts include cobalt potassium cyanide, sodium cobalt six nitro, and mixtures thereof; Nickel salt is nickel-potassium cyanide. An example of a suitable manganese salt is potassium manganese. An example of a suitable chromium salt is potassium dichromate. The carbonization and graphitization catalysts typically added to the water in which the resin particles are suspended in a concentration in the range from 0.001 mol to 0.5 mol of metal catalyst per liter of water.

The ratios between metal precursors (tungsten, molybdenum, vanadium) or graphitizing catalysts and ion-exchange resin are typically, suitably in the range from 0.0001 to 0.02 mol of precursor metal per gram of anion-exchange resin.

The pre-carbonization temperature for the dried ion-exchanged resin particles is preferably in the range from 200 to 500° C., and is suitably conducted in an air or nitrogen atmosphere. Following the pre-carbonization step, the graphitization of the metal-containing resin is suitably performed in a tube furnace with the temperature is suitably gradually increased to a final graphitization temperature in the range from 600 to 1400° C. For many applications a final graphitization temperature of about 750° C. yields suitably small metal carbides on a graphite particle of abundant surface area. A suitable heating rate for the graphitization is in the range of 1-20° C./min. A typical heating time is about one-half hour to about three hours. Gases suitable for use in the graphitization process are nitrogen, argon, helium, carbon monoxide, carbon dioxide, hydrogen sulfide and hydrogen and mixtures thereof.

As an alternative to conducting graphitization in a gas flow-through tube furnace, the graphitization step may be performed in a microwave oven by a rapid intermittent microwave heating (IMH) method. Preferably, the microwave energy is repeatedly turned on for a period of seconds, and turned for a period of seconds, during a determined total heating period. Microwave heating significantly reduces the preparation time compared with traditional heating methods. It is uniform in heating, convenient, and safe. It is not necessary to use inert gas due to the formation of reductive carbon atmosphere in the chamber during the heating process. Depending on the composition and mass of the material to be graphitized, a suitable total IMH time may be in the range of 5 minutes to one hour. The temperature in the graphitizing material is suitably in the range of about 200-1200° C. A suitable frequency for the radiation is 2.45 GHz.

Following graphitization the composite material is suitably treated in aqueous hydrochloric acid, or sulfuric acid, or nitric acid, or mixtures thereof to remove metal material used to promote carbonization and graphitization of the ion-exchanged resin particles. The treatment time is in the range from 6 to 48 h. Finally, the composite material washed is suitably washed with deionized water and dried. The dried product is an electrically conductive, particulate composite of graphite carrying low nanometer size particles of transition metal carbide. The composite material is particularly useful for carrying platinum particles or other metal catalyst particles for use in an electrode in an electrochemical cell or system.

Accordingly, in another embodiment of the invention a practice is disclosed for depositing nanometer-size particles of platinum or other catalyst metal on the transition metal carbide/graphitized carbon composite materials produces as just described in this specification.

A suitable procedure for deposition of a platinum group metal may be summarized as follows. Particles of carbide/graphitized carbon composite material are dispersed in a suitable solvent, such as water, while the treated volume of water is subjected to ultrasonic vibrations of a suitable energy to disperse the composite material for suitable deposition of particles of a catalyst metal. A selected catalytic metal precursor compound is added to and dissolved in the water, typically as an acidic salt, as the composite particles are dispersed using ultrasonication. The pH value of the mixture is adjusted to 10 to precipitate catalyst metal on the dispersed composite support particles. The mixture is heated, suitably using the IMH method. The pH of the mixture may be further adjusted, if necessary. Ultrasonic agitation of the dispersion is stopped and the now catalyst-bearing, support particles are removed from the dispersing liquid and dried. The dried particles may be ground to a suitable aggregate particle size if necessary.

Examples of suitable liquid solvents for deposition of the catalyst particles on the composite support particles include water, alcohols, aldehydes, organic acids, and mixtures thereof.

Examples of catalyst metal precursors are chloroplatinic acid, 2-nitroso-diamine platinum, platinum potassium chloride, sodium chloride platinum, platinum amine, acetyl acetone of platinum, ruthenium chloride, ruthenium chloride potassium, sodium chloride ruthenium, ruthenium acetylacetonate, palladium, rhodium chloride, rhodium acetate, rhodium nitrate, rhodium soluble organic compounds, water-soluble organic compounds of platinum, ruthenium water-soluble organic compounds, palladium water-soluble organic compounds and other platinum group metals in the water-soluble salts and organic compounds and mixtures thereof. Other active metals are nickel, cobalt, tin, lead, gold, silver, and their water-soluble inorganic and organic compounds and mixtures thereof.

The pH value of the solution of the catalyst metal precursor compound may be adjusted with hydrochloric acid to the value of 1-6. The pH value in the solvent for deposition of the active metal on the dispersed composite particles may be adjusted with ammonia, sodium hydroxide, potassium hydroxide, citric acid or ammonia and mixtures thereof. The pH value is typically in the range from 8 to 12.

Suitably, the dried catalyst-bearing composite support material is subjected to 1 MH treatment for 1-30 min.

Compared with existing technologies, the invention of one-step targeting synthesis of nanosized carbide on graphitized carbon composite materials and electrocatalysts using the same have unique advantages as follows.

First, the process of this invention discloses a simple, rapid, environmentally friendly method to mass production nano-sized carbide/graphitized carbon supported electrocatalysts. Second, the higher graphitization degree and crystallinity of the carbon can be reached under low-temperature heating. Third, metal ions are anchored in the ion-exchange resin at ionic level and the dispersion is uniform, resulting in the formation of nanosized particles less than 10 nm and high specific surface area. Such electrocatalysts provide high activity for the alcohol oxidation and oxygen reduction reaction (ORR) due to the synergistic effect. The electrocatalysts are expected to be more stable in acidic and alkaline conditions compared with that of Pt/C electrocatalyst.

The following examples illustrate the preparation and testing of illustrative embodiments of the invention.

Example 1

Preparation of Tungsten Carbide on Graphitized Carbon (1) Particles of a commercial acrylic anion exchange resin were pretreated for 12 hours while ultrasonically dispersed in water containing 1 mol $L^{-1}$ NaClO and 1 mol $L^{-1}$ NaOH solution. (2) 1.3 g (0.005 mol) of ammonium para-tungstate $[(NH_4)_{10}(W_{12}O_{41}) \cdot 5H_2O]$ was mixed with 100 ml of deionized water. Ten grams of pretreated acrylic anion exchange resin particles were added to the tungsten solution with magnetic stirring for 6 h. (3) 1.65 g (0.005 mol) potassium ferricyanide $[K_3Fe(CN)_6]$ was added into the solution, with magnetic stirring for 6 hours. The resin particles were then filtered, washed with deionized water, and dried. (4) The ionically exchanged acrylic anion exchange resin particles were heated in a furnace for pre-carbonization at 350° C. for 2 hours. (5) The carbonized-resins were placed in a tube furnace for heat treatment at a heating rate of 10° C./min to 1000° C. under inert gas at a flow rate of 100 mL/min for 1 hour. (6) The graphitized sample was ground and dipped in aqua regia, under magnetic stirring for 24 h at 80° C. The sample was then washed with deionized water until pH=6-8 and dried at 80° C. for 12 hours. FIGS. 1-3, 4a and 4b show the XDR, EDS, Raman and TEM results of this tungsten carbide in graphitized carbon sample. The descriptions of these figures, presented above in this specification, describe and confirm characteristics of the WC/GC sample.

Example 2

Preparation of Molybdenum Carbide on Graphitized Carbon (1) Particles of a commercial acrylic anion exchange resin were dispersed and soaked for 12 hours in a mixture of 1 mol $L^{-1}$ NaClO and 1 mol $L^{-1}$ NaOH in aqueous solution. (2) Ammonium molybdate, $[(NH_4)_6Mo_7O_{24}]$, (0.88 g, 0.005 mol) was dissolved in 100 ml of deionized water and then added to 10 g of pretreated acrylic anion exchange resins with magnetic stirring for 6 hours. (3) Potassium ferricyanide (1.65 g, 0.005 mol) was added into the solution with magnetically stirring 6 hours. The resin particles were then filtered from the solution, washed with deionized water, and dried. (4) The ionically exchanged acrylic anion exchange resin particles were then placed into a furnace for pre-carbonization at 350° C. for 2 hours. (5) The carbonized-resins were placed into a tube furnace for graphitization heat treatment at the heating rate of 10° C./min until a temperature of 1000° C. was reached, under inert gas flowing through the tube at 100 mL/min for 1 hour. (6) The agglomerated graphitized sample was ground into particles which were dipped in hydrochloric acid, under magnetic stirring for 24 h at 80° C. to remove the iron graphitization catalyst material. The graphitized particles were then washed with deionized water until pH=6-8 and dried at 80° C. for 12 hours. FIGS. 5-6, 7a and 7b show the XDR, EDS and TEM results of this molybdenum carbide/graphitized carbon composite material. The descriptions of these figures, presented above in this specification, describe and confirm characteristics of the MoC/GC sample.

Example 3

Preparation of Vanadium Carbide on Graphitized Carbon (1) Pretreatment of acrylic anion exchange resin particles for 12 hours with stirring in a mixture of 1 mol NaClO and 1 mol $L^{-1}$ NaOH solution. (2) Ammonium meta-vanadate $[NH_4VO_3]$, in the amount of 0.6 g (0.005 mol) was dissolved in 100 ml of deionized water. Ten grams of pretreated acrylic anion exchange resin particles were added into the vanadium anion containing solution. The resin particles are stirred magnetically for 6 hours. (3) Potassium ferricyanide (graphitization catalyst) was added in the amount of 1.65 g (0.005 mol) into the solution with magnetic stirring for 6 hours. The ion exchanged resin particles were then filtered from the solution, washed with deionized water, and dried. (4) The particles of ionically exchanged acrylic anion exchange resin was placed in a furnace for pre-carbonization at 350° C. for 2 hours. (5) The carbonized-resin particles were then placed in a tube furnace and heated at a rate of 10° C./min until a temperature of 1000° C. was reached. The heating was conducted under an inert gas flowing at 100 mL/min for 1 hour. (6) The agglomerated graphitized sample was ground into particles and the particles were dipped in nitric acid, using magnetic stirring for 24 hours at 80° C. to remove the graphitization catalyst material, and then washed with deionized water until pH=6-8, and dried at 80° C. for 12 hours. FIGS. 8-9, 10a and 10b show the XDR, EDS and TEM analytical results for the vanadium carbide and graphite composite material. The descriptions of these figures, presented above in this specification, describe and confirm characteristics of the VC/GC sample.

Examples 4A and 4B

A. This example followed the steps of example 1 except that the potassium ferricyanide graphitization catalyst was replaced with 2.02 g sodium hexanitritocobaltate. B. This example followed the steps of example 1 except that the potassium ferricyanide graphitization catalyst was replaced with 2.1 g potassium ferrocyanide.

Example 5

This example followed the steps of example 1 except that the potassium ferricyanide graphitization catalyst was replaced with 1.2 g nickel potassium cyanide.

Example 6

This example followed the steps of example 2 except that the potassium ferricyanide graphitization catalyst was replaced with 2.02 g sodium hexanitritocobaltate.

Example 7

This example followed the steps of example 2 except that the potassium ferricyanide graphitization catalyst was replaced with 1.2 g nickel potassium cyanide.

Example 8

This example followed the steps of example 3 except that potassium ferricyanide graphitization catalyst was replaced by 2.02 g sodium hexanitritocobaltate.

Example 9

This example followed the steps of example 3 except that the potassium ferricyanide graphitization catalyst was replaced with 1.2 g nickel potassium cyanide.

Example 10

This example followed the steps of example 1 except that the graphitization was performed by an intermittent microwave heating method instead of using the tube furnace heating method. In this example the IMH procedure was practiced using 10 seconds on and 10 seconds off heating cycles, repeated 30 times. The microwave frequency was 2.45 GHz.

Example 11

This example followed the steps of example 2 except that the graphitization was performed by an intermittent microwave heating method instead of the tube furnace heating method. The temperature in the heated material was controlled in the range of 800-1200° C. for 30 min. The microwave frequency was 2.45 GHz.

Example 12

This example followed the steps of example 3 except that the graphitization was performed using an intermittent microwave heating method instead of the tube furnace heating method. In this example the IMH procedure was practiced using 10 seconds on and 10 seconds off heating cycles, repeated 30 times. The microwave frequency is 2.45 GHz.

Example 13

Figure 11:
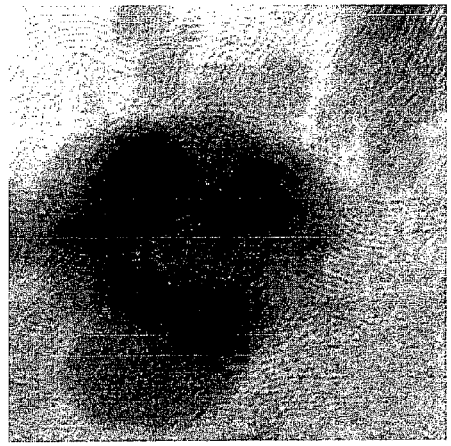
FIG. 11 is a TEM image of a sample of Pt—WC/GC (Platinum loading: 36 wt %). The WC and Pt particles are in contact with each other and evenly mixed on graphitized carbon. The lattice fringes of the graphitized carbon, WC and Pt are observed together. The particle size of WC is about 8-10 nm and the particle size of Pt is about 2-4 nm. These conditions are conducive to a synergistic effect between the Pt and its WC/GC support particles.

Preparation of Pt Supported on Tungsten Carbide/Graphitized Carbon (1) Two hundred milligrams of prepared tungsten carbide/graphitized carbon (Example 1) were placed in a beaker with 50 ml ethylene glycol using ultrasonic dispersion for 30 min; (2) After this initial period of dispersing the composite particles, 7.0 ml of chloroplatinic acid [$H_2PtCl_6$] solution (platinum content of 18.5 mg ml$^{-1}$) was added with continued ultrasonic dispersion; (3) The pH of the solution was slowly increased to a value of 10 by the addition of concentrated aqueous ammonia; (4) The beaker containing the liquid and particles was placed in a microwave oven. Microwave heating was performed using cycles of five seconds on and five seconds off for 20 times. The liquid and particle mixture was then allowed to cool to room temperature; (5) The liquid and particle mixture was then stirred as the pH of the solution was reduced to 2 by the addition of aqueous HCl solution. Stirring of the acidic liquid-particle mixture was continued for 2 hours; (6) The platinum-containing, composite transition metal carbide/graphite particles were filtered from the alcohol-water liquid and washed with deionized water. Then the platinum-composite support particles were dried in a vacuum drying oven at 80° C. for 12 hours to obtain the electrocatalyst particles with a platinum content of 36 wt %, which was determined by inductively coupled plasma atomic emission spectroscopy (ICP IRIS(HR), USA. FIG. 11 shows the TEM image of the catalyst material.

Example 14

Figure 12:
FIG. 12 is a TEM image of a Pt—$Mo_2C$/GC sample (Platinum loading: 36.5 wt %). The MoC and Pt particles are in contact with each other and evenly mixed on the graphitized carbon. The lattice fringes of the graphitized carbon, MoC and Pt are observed together. The particle size of MoC is about 2-5 nm and the particle size of Pt is about 2-4 nm. These conditions are conducive to a synergistic effect between the Pt and its MoC/GC support particles.

Preparation of Pt Supported on Molybdenum Carbide/Graphitized Carbon (1) Two hundred milligrams of prepared molybdenum carbide/graphitized carbon (Example 2) were placed in a beaker with 50 ml of ethylene glycol and dispersed using ultrasonic dispersion for 30 min; (2) After this initial period of dispersing the composite particles, 7.0 ml chloroplatinic acid solution (platinum content of 18.5 mg ml$^{-1}$) was added with continued ultrasonic dispersion; (3) The pH of the solution was increased to a value of 10 by the slow addition of concentrated aqueous ammonia; (4) The beaker containing the liquid and particles were placed in a microwave oven. Microwave heating was performed using cycles of 5 seconds on and 5 seconds off repeated 20 times. The liquid and particle mixture was then allowed to cool to room temperature; (5) The liquid and particle mixture was then stirred as the pH of solution was reduced to 2 by the addition of aqueous HCl solution. Stirring of the acidic liquid-particle mixture was continued for 2 hours; (6) The platinum-containing, composite transition metal carbide/graphite particles were filtered from the alcohol-water liquid and washed with deionized water. Then the platinum-composite support particles were dried in a vacuum drying oven at 80° C. for 12 hours to obtain the electrocatalyst particles with a platinum content of 36.5 wt %, which was determined by inductively coupled plasma atomic emission spectroscopy (ICP IRIS(HR), USA. FIG. 12 shows the TEM image of the catalyst material.

Example 15

Figure 13:
FIG. 13 is a TEM image of a Pt—VC/GC sample (Platinum loading: 36 wt %). The $V_8C_7$ and Pt particles are in contact with each other and evenly mixed on graphitized carbon. The lattice fringes of the graphitized carbon, $V_8C_7$ and Pt are observed together. The particle size of $V_8C_7$ is about 3-6 nm and the particle size of Pt is about 2-4 nm. These conditions are conducive to a synergistic effect between the Pt and its $V_8C_7$/GC support particles.

Preparation of Pt Supported on Vanadium Carbide/Graphitized Carbon (1) Two hundred milligrams of prepared molybdenum carbide/graphitized carbon (Example 2) were placed in a beaker with 50 ml of ethylene glycol and dispersed using ultrasonic dispersion for 30 min; (2) After this initial period of dispersing the composite particles, 7.0 ml chloroplatinic acid solution (platinum content of 18.5 mg ml$^{-1}$) was added with continued ultrasonic dispersion; (3) The pH of the solution was increased to a value of 10 by the slow addition of concentrated aqueous ammonia; (4) The beaker containing the liquid and particles were placed in a microwave oven. Microwave heating was performed using cycles of 5 seconds on and 5 seconds off repeated 20 times. The liquid and particle mixture was then allowed to cool to room temperature; (5) The liquid and particle mixture was then stirred as the pH of solution was reduced to 2 by the addition of aqueous HCl solution. Stirring of the acidic liquid-particle mixture was continued for 2 hours; (6) The platinum-containing, composite transition metal carbide/graphite particles were filtered from the alcohol-water liquid and washed with deionized water. Then the platinum-composite support particles were dried in a vacuum drying oven at 80° C. for 12 hours to obtain the electrocatalyst particles with a platinum content of 36 wt %, which was determined by inductively coupled plasma atomic emission spectroscopy (ICP IRIS(HR), USA. FIG. 13 shows the TEM image of the catalyst material.

Figure 14A:
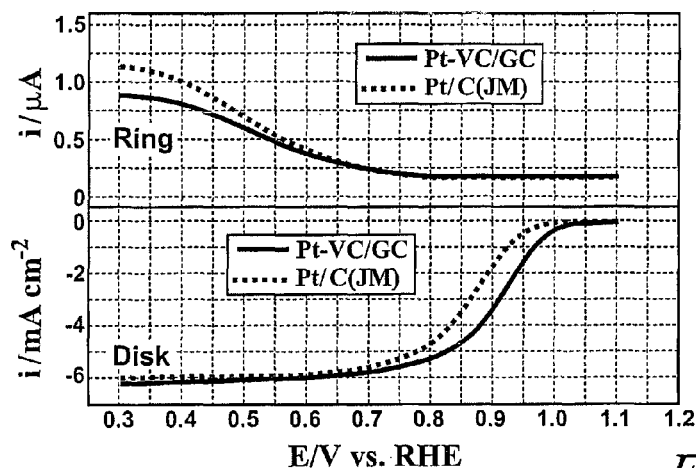
FIG. 14a is a graph of rotating ring-disc electrode polarization curves for a Pt—VC/GC sample (as characterized in FIG. 13) and a commercial platinum on carbon (Pt/C) sample, tested and compared as electrocatalysts, at 1600 rpm in oxygen-saturated 0.1 mol $L^{-1}$ $HClO_4$ at 25° C. with a scan rate of 5 $mVs^{-1}$. The Pt—VC/GC electrocatalyst shows higher electrocatalytic activity toward the oxygen reduction reaction (ORR) than that of Pt/C electrocatalyst in terms of the onset potential. The Pt—VC/GC electrocatalyst was 45 mV more positive compared to the Pt/C electrocatalyst. The conduct of the ORR on both electrocatalysts is seen as a four-electron process since no current was detected on the ring electrode.
Figure 14B:
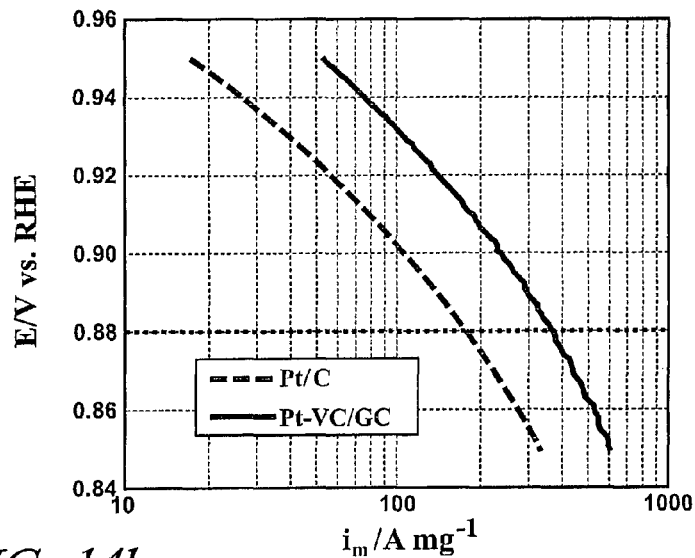
FIG. 14b is a graph showing the kinetic currents of two electrocatalysts calculated from the experimental data using the well-known mass transport correction for rotating disk electrode, $i_k=i_d i/(i_d-i)$, where i is the experimentally obtained current, $i_d$ refers to the measured diffusion-limited current and $i_k$ the mass-transport-free kinetic current. The specific activity can be determined via the calculation of $i_k$ using equation (1) and normalized with the Pt loadings. The kinetic currents measured from the curves in FIG. 14b are 240 mA $mg^{-1}_{Pt}$ for Pt—VC/GC and 107 mA $mg^{-1}_{Pt}$ for Pt/C (JM) at 0.9 V, as summarized in Table 1.
Figure 14C:
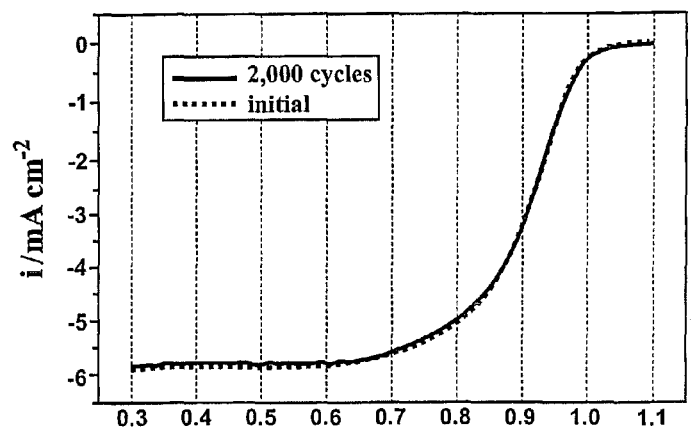
FIG. 14c is a graph showing the catalytic activity of Pt—VC/GC, measured as the currents of $O_2$ reduction obtained before and after potential cycling, showed negligible loss in half-wave potential over the cycling period.

The graphs of FIGS. 14a-14c show the performance of the Pt—$V_8C_7$/GC and Pt/C electrocatalysts for ORR. It is proved that the ORR performances of both electrocatalysts are four-electron reduction process without the formation of $H_2O_2$. Data are shown for the positive-going sweep with a scan rate of 5 mV s$^{-1}$ from 0 to 1.1 V (RHE). The Pt—$V_8C_7$/GC has a more positive onset potential compared to that of the Pt/C. The kinetic current ($i_m$ at 0.9V) of the Pt—$V_8C_7$/GC is higher than that of the Pt/C, which could be attributed to the synergistic effect between Pt and $V_8C_7$.

TABLE 1

Comparison of the catalytic activities of two electrocatalysts for ORR.

| Catalysts | $E_{Onset}$ (V) | $E_{1/2}$ (V) | $i_m$ at 0.9 V (A g$^{-1}_{Pt}$) |
|---|---|---|---|
| 47.6% Pt/C (JM) | 0.964 | 0.862 | 107.4 |
| 36% Pt-$V_8C_7$/GC | 1.02 | 0.913 | 216.2 |

Example 16

This example follows the steps of example 13 except that Pt is replaced by Pd.

Example 17

This example follows the steps of example 14 except that Pt is replaced by Pd.

Example 18

This example follows the steps of example 15 except that Pt is replaced by Pd.

Example 19

This example follows the steps of example 13 except that Pt is replaced by PtRu.

Example 20

This example follows the steps of example 14 except that Pt is replaced by PtRu.

Example 21

This example follows the steps of example 15 except that Pt is replaced by PtRu.

Thus, methods are illustrated for the placement of ions of one or more transition metals in pores of particles of an alkaline anion exchange resin and the subsequent carbonization and graphitization of the resin composition to from composite particles of nanometer-size transition metal carbide carried on graphite. As further illustrated, very small particles of a platinum group metal (or the like) may be deposited on the composite particles which then serve as electrically conductive supports for the catalyst particles. These supported catalyst particles may be used, for example, in an electrode composition in an electrochemical cell.

The various examples of practices of this disclosure are intended to be illustrative and not limiting of the scope of the invention.

The invention claimed is:

1. A method of forming particles of a transition metal carbide compound on larger particles of graphite; the method comprising:
    dispersing particles of a carbon-based macro-porous anion exchange resin in a volume of an aqueous solution of a transition metal compound to exchange anions of the transition metal from the solution onto active ion exchange sites on molecular chains of particles of an anion exchange resin to obtain a transition metal content in and on the particles of the anion exchange resin, the anion exchange resin having anions at the active ion exchange sites on the molecular chains of the resin which are exchangeable with anions of the transition metal from the solution;
    dispersing particles of the transition metal-containing resin particles in a volume of an aqueous solution of a compound of a metal, for catalyzing carbonization of the resin particles, to deposit anions of the catalyst metal into the resin particles;
    heating the transition metal containing and catalyst metal-containing resin particles to initiate carbonization of the resin particles;
    further heating the particles to a higher temperature to complete carbonization and graphitization of the initial resin material and to form particles of transition metal carbide compound on larger formed particles of graphite; and
    removing catalyst metal material from the graphite to leave a composite material consisting essentially of particles of transition metal carbide compound on larger graphite particles, the metal carbide particles having maximum average dimensions up to about fifteen nanometers.

2. A method as recited in claim 1 in which the transition metal is one or more selected from the group consisting of molybdenum, tungsten, and vanadium.

3. A method as recited in claim 1 in which the anion exchange resin is an acrylic acid anion exchange resin or a styrene anion exchange resin.

4. A method as recited in claim 1 in which the anion exchange resin is an acrylic acid anion exchange resin or a styrene anion exchange resin, and the resin is treated with an aqueous solution of sodium hypochlorite to provide suitable exchangeable ions at the active exchange sites on the molecular chains of the resin before ions of a transition metal are exchanged onto the active exchange sites of the resin.

5. A method as recited in claim 1 in which particles of a platinum group metal are subsequently deposited on the particles of transition metal carbide and graphite composite material.

6. A method of forming particles of a transition metal carbide compound on larger particles of graphite; the method comprising:
    dispersing particles of a carbon-based macro-porous anion exchange resin in a volume of an aqueous solution of anions of a transition metal compound to deposit anions of the transition metal onto active anion exchange sites of the resin particles, the transition metal being selected from the group consisting of molybdenum and vanadium, the macro-porous anion resin having ions at the active ion exchange sites on the molecular chains of the anion exchange resin which are exchangeable with the anions of the transition metal from the aqueous solution;
    dispersing particles of the transition metal-containing resin particles in a volume of an aqueous solution of anions of a metal, for catalyzing carbonization of the resin particles, to deposit anions of the catalyst metal into the resin particles;

heating the transition metal containing and catalyst metal-containing resin particles to a temperature up to about 350° C. to initiate carbonization of the resin particles;

further heating the particles to a temperature up to about 1000° C. to complete carbonization and graphitization of the initial resin material and to form particles of transition metal carbide compound on larger formed particles of graphite; and removing catalyst metal material from the graphite to leave a composite material consisting essentially of particles of transition metal carbide compound on larger graphite particles, the metal carbide particles having maximum dimensions up to about fifteen nanometers.

7. A method as recited in claim 6 in which the anion exchange resin is an acrylic acid anion exchange resin or a styrene anion exchange resin.

8. A method as recited in claim 6 in which the anion exchange resin is an acrylic acid anion exchange resin or a styrene anion exchange resin and the resin is treated in sodium hypochlorite solution before ions of a transition metal are deposited into pores of particles of the resin.

9. A method as recited in claim 6 in which particles of a platinum group metal are subsequently deposited on the particles of transition metal carbide and graphite composite material.

* * * * *